United States Patent [19]
Lin et al.

[11] Patent Number: 5,369,390
[45] Date of Patent: Nov. 29, 1994

[54] MULTILAYER ZNO VARISTOR

[75] Inventors: Jun-Nun Lin, Taichung Hsien; Chio-Chun Kao, Hsinchu, both of Taiwan, Prov. of China

[73] Assignee: Industrial Technology Research Institute, Chutung, Taiwan, Prov. of China

[21] Appl. No.: 35,673

[22] Filed: Mar. 23, 1993

[51] Int. Cl.$^5$ .............................................. H01C 7/10
[52] U.S. Cl. ...................................................... 338/21
[58] Field of Search ................ 338/20, 21; 252/512, 252/518

[56] References Cited

U.S. PATENT DOCUMENTS

| | | |
|---|---|---|
| 4,290,041 | 9/1981 | Utsumi et al. . |
| 4,811,164 | 3/1989 | Ling et al. . |
| 4,918,421 | 4/1990 | Lawless et al. . |
| 4,959,262 | 9/1990 | Charles et al. . |
| 5,115,221 | 5/1992 | Cowman ................. 338/21 |
| 5,119,062 | 6/1992 | Nakamura et al. ............ 338/20 |

*Primary Examiner*—Marvin M. Lateef
*Attorney, Agent, or Firm*—Merchant, Gould, Smith, Edell, Welter & Schmidt

[57] ABSTRACT

A multilayer zinc oxide varistor including bismuth oxide system ingredients, and having variable breakdown voltages by controlling the thickness of the ceramic material.

5 Claims, 3 Drawing Sheets

MULTILAYER ZNO VARISTOR

BACKGROUND OF THE INVENTION

The present invention relates to a multilayer zinc oxide (ZnO), varistor and a composition for use in the multilayer ZnO varistor, in particular, to a composition containing at least 90 mole % of ZnO and at most 10 mole % of additives for the multilayer ZnO varistor with variable breakdown voltages.

Generally speaking, sudden surges of voltage or electric current inevitably occurs in electric or signal circuits. The source of these surges is voltage transients mainly resulting from lightening or, starting up and on/off switching operations of generators or motors. Voltage surges and disturbances can damage electric components of the electric circuits and even cause fire. Varistors, also known as surge absorbers, are normally used to protect electric circuits and electric components against spurious voltage surges and voltage transients.

Varistors are resistors with resistance varying with voltage with a nonlinear coefficient. Varistors have high resistance and are good resistors when loaded with voltage below the critical voltage. However, when voltages are higher than the critical voltage, the resistance of the varistor sharply decreases and the electric current through the varistor will greatly increase. That is, varistors possess the ability to adsorb surges, reduce overload voltage to a safe level and prevent electric components from being damaged by surges. Hence, varistors are called "surge absorbers".

The most important electric characteristic of varistors is the breakdown characteristics which can be represented in accordance with the relationship:

$$I=KV^\alpha$$

wherein I represents the electric current through the element, K is a constant, V represents the voltage applied across the element and $\alpha$ is a nonlinear coefficient.

The value of V selected to give a 1 mA current through the element is called the "breakdown voltage", $V_{1mA}$. The greater the value of $\alpha$, the more significant the influence of the voltage on the electric current. In other words, the greater the value of $\alpha$, the better the voltage control characteristic, and the stronger the protecting ability of the varistor will be for the electric circuit.

Zinc oxide varistors, having an extremely high value of nonlinear coefficient and a significantly excellent surge absorbing capability, are widely applied as surge absorbing elements, arresters, and voltage stabilizer elements, etc. To make compact communication equipment, the trend is to make electric components which are light weight, thin short in length, small in size, having low power consumption, and operating at low voltages. Circuit protecting devices, such as varistors, naturally should also meet the above requirements.

The breakdown voltage of zinc oxide varistors is represented by the equation of $$V_{1mA} = V_g \times D/d$$

wherein D represents the thickness of the varistor layer between two parallel internal electrodes in a varistor, d represents the size of a parallel grain and $V_g$ represents the breakdown voltage per grain boundary. The $V_g$ value of ZnO varistors is found experimentally to be about 3–4 V which is not influenced by changes in the compositions of additives or manufacture temperatures. Hence, in order to produce zinc oxide varistors with low breakdown voltage, the control of the parameters D and d are important. The grain sizes of the varistor can be controlled by varying the composition and the sintering temperature. For varistors used at low voltages, grain growth promoters such as $TiO_2$ or seeds are added into the varistor composition to promote the grain growth. However, the addition of the grain growth promoters would result in abnormal grain growth. The distribution of grain sizes is difficult to control and the surge withstanding capabilities of the varistors is reduced. Alternatively, the growth of average grain size can be achieved by increasing the sintering temperature. However, the sintering temperature has an upper limit of about 1,400° C., above which zinc oxide and additives will be evaporated and thereby, the characteristics of the varistor are lost. Hence, the lower limit of the breakdown voltage is also influenced and therefore limited.

For varistors used at low voltages, control of the parameter D can be achieved by reducing the varistor thickness by using either the thin foil method, sandwich method, thick film method or multilayer method. The thin foil method utilizes conventional plate-pressing machines to produce the a varistor thickness of about 0.3 mm which is the lowest limit in this method. However, the precision of thin foil type varistors is difficult to control and the quality thereof is poor. The sandwich method relates to addition of additives into zinc oxide single crystal chips and sintered zinc oxide poly-crystal ceramic chips and then heating at high temperatures to produce sandwich type varistors. The additives will diffuse into okay ceramic chip at the high temperature. The breakdown voltage of the produced varistor is quite low; for instance, about 3 V, but the surge withstanding capability thereof is poor for practical use. The thick film method comprises the steps of forming a slurry of zinc oxide, additives and glass; screen printing heat resistant Pt or Pd conductive gels onto alumina substrate; applying a coating of the slurry of about 100–200 $\mu$m thickness thereon; co-firing at high temperature; printing silver gel on the combination obtained above and baking to obtain thick film type varistors. Theoretically, the nonlinear coefficient $\alpha$ of thick film varistors is only about one half that of ordinary varistors. That means, at low breakdown voltages, it has a low value of nonlinear coefficient $\alpha$ and needs a substrate. Further, because of the comparatively poor compactness, thick film type varistors have poor surge withstanding capability.

Recently, in U.S. Pat. No. 4,290,041, Utsumi et al. utilized a concept in manufacturing multilayer capacitors to produce multilayer zinc oxide varistors with variable breakdown voltages. The Utsumi's method comprises the steps of tape casting green sheet, printing internal electrodes, laminating, cutting, sintering and applying external electrodes. Pb—B—Zn—Si (Borosilicate-lead-zinc) glass is used to substitute conventional component $Bi_2O_3$ in varistor compositions. The characteristics of varistors are originated in the interface of zinc oxide and glass. In order to retard the degradation, an adequate amount of glass is added to manufacture zinc oxide disk-type varistors. However, the addition of glass would reduce the surge withstanding capabilities of the varistors. For this reason, glass is normally not added for disk type varistors in commercial production processes. The addition of Pb—Zn—B—Si glass to substitute $Bi_2O_3$ in varistor compositions in Utsumi's patent finally results in poor surge withstanding capability.

In addition to breakdown voltage $V_{1mA}$ and nonlinear coefficient $\alpha$, degradation is also an important factor to be considered in practical use. When a varistor is used in an electric circuit, there will be some leak current passing through the varistor. Due to Joule's effect, the temperature of the varistor will increase, and the leakage current will also increase with the increase of the temperature. Furthermore, the value of $V_{1mA}$ will reduce and the varistors start to degrade. Thus, it is effective to make use of leakage current testing methods to measure the life and reliability of the zinc oxide varistors.

SUMMARY OF THE INVENTION

Therefore, it is an object of the present invention to provide a composition for a multilayer zinc oxide varistor, which contains Bi system ingredients for replacing Pb—Zn—B—Si glass used before to increase the surge withstanding capability of the varistors and to mitigate the above drawbacks.

Another object of the present invention is to provide a multilayer zinc oxide varistor which contains a small amount of glass to decrease sintering temperatures, the leakage current and degradation.

A further object of the present invention is to provide a multilayer zinc oxide varistor with variable breakdown voltages by controlling the exact thickness of the green sheet, the height of the doctor blade and the viscosity of the slurry.

These and other objects, advantages and features of the present invention will be more fully understood and appreciated by reference to the written specification.

BRIEF DESCRIPTION OF THE DRAWINGS

The present invention will be further explained with reference to the annexed drawings, wherein.

DETAILED DESCRIPTION OF THE INVENTION

Figure 1:
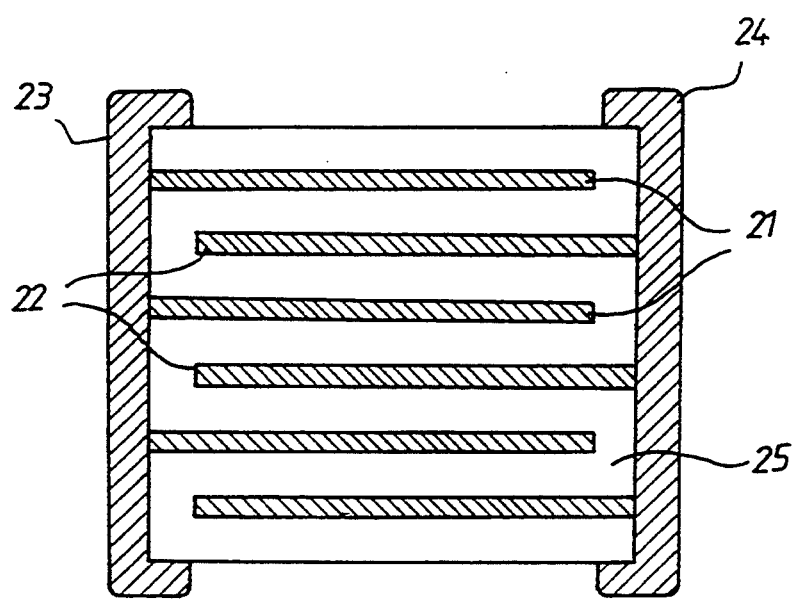
FIG. 1 is a cross-sectional view of a multilayer zinc oxide varistor of the present invention.

In accordance with the present invention, as a starting raw material, a mixture of zinc oxide (ZnO) in an amount of at least 90 mole % and an additive in an amount of at most 10 mole %, provided that the total amount of zinc oxide and additive is less than 99.95 mole %, constitutes the ceramic base body in a multilayer zinc oxide varistor. The additives comprise at least three metal oxides in which the metal is selected from a group consisting of cobalt (Co), manganese (Mn), bismuth (Bi), antimony (Sb), chromium (Cr), nickel (Ni), titanium (Ti), tin (Sn), lanthanum (La), niobium (Nd), praseodymium (Pr), barium (Ba), magnesium (Mg), cerium (Ce) and boron (B). Preferably, the ceramic base body contains component Bi in an amount of 0.05 to 5 mole % and the ceramic base body contains 0 to 10% of glass by weight of glass based on the total weight of the total oxides. Except for the glass, the raw materials all have a purity of at least 99%. The composition of additive glass is shown in the following Table 1.

TABLE 1

| Glass symbol | Composition (weight %) | | | |
| --- | --- | --- | --- | --- |
| | PbO | $B_2O_3$ | ZnO | $SiO_2$ |
| A | 57 | 18 | — | 34 |
| B | — | 27 | 63 | 10 |
| C | — | 25 | 63 | 12 |
| D | 60 | 21.5 | 12 | 6.5 |

According to the present invention, in the proper amount of oxides in powder form based on the stoichiometric amount of the constituents is added deionized water and the mixture is ground in a ball mill for 24 hours. The mixture is filtered, dried and then calcined at a temperature of 600° to 900° C. for 2 hours. In order to decrease the phenomena of aggregation of powder while calcining, in the calcined powder is added deionized water and the mixture is ground in a ball mill for 24 hours, filtered, dried and stored for use for tape casting.

In a mixture consisting of the proper amount of the calcined powder obtained above and an adequate amount of glass, are added reagents including binder, dispersant, plasticizer and releasing agent, to form a slurry. A doctor blade is utilized to shape the slurry into a green sheet having a thickness of 20 to 200 μm by controlling the gap of the doctor blade and the viscosity of the slurry. A patch with a definite dimension is cut from a green sheet and onto it is printed an internal electrode of which its material is selected from the group consisting of palladium, silver, platinum, gold, rhodium and an alloy of any two of these noble metals. The internal electrode is mounted onto the surface of the green sheet with one edge being flush with one edge of the green sheet, and with the other three edges indented some distance from the other three respective edges of the green sheet. About 20 layers of green sheet patches are stacked such that a half of the patches are arranged with the edge flush with the edge of the slurry coating directed to one side, and such that a half of the patches are arranged with the edge flush with the edge of the slurry coating directed to the same side opposite that of the first half. The patches of the first and the second half are stacked alternately. In order to reduce the leakage current of the product, about two to five raw patches without internal electrodes printed thereon are superimposed above and under the stacked assembly respectively. Subsequently, the stacked assembly is laminated under a pressure of 500 to 3,000 psi and at a temperature in the range of 50° to 150° C. The laminated assembly is then cut in such a way that the internal electrodes will be exposed at two opposite edges of the laminated assembly. The assembly is then sintered at a temperature of 950° to 1,300° C. for 0.5 to 4 hours. A coating of an external electrode silver paste is applied to the two opposite edges, wherein the internal electrode edges are exposed. The resultant assembly is sintered at 600° C. for the reduction of the silver paste and the multilayer zinc oxide varistor is obtained. A cross-sectional view of the above obtained varistor is shown in FIG. 1.

The multilayer zinc oxide varistor as shown in FIG. 1 comprises a first external electrode 23 on a first surface of the ceramic base body 25, a second external electrode 24 on a second surface of the ceramic base body 25 opposite to the first side, a plurality of first internal electrodes 21 extending in parallel in the ceramic base body 25 and all with the same corresponding edge connected to the first external electrode 23, and a plurality of second internal electrodes 22, alternately located in parallel between the first internal electrodes 21, also extending in parallel in the ceramic base body 25 and all with the same corresponding edges connected to the second external electrode 24. Except of the one edge of each internal electrode 21 and 22 which is connected to the respective external electrode 23 and 24, the other three edges of back of the internal electrodes are all enclosed within the ceramic base body 25. The breakdown voltage of the multilayer varistor according to this invention is controlled by varying the thickness of the varistor layer between the two internal electrodes. As a result, a multilayer zinc oxide varistor with variable breakdown voltages according to the present invention is obtained.

The following examples are offered by way of illustration. The examples are not intended to limit the scope of the invention in any respect and should not be so construed.

EXAMPLES

EXAMPLE 1

A mixture of zinc oxide (ZnO), $Bi_2O_3$, $Sb_2O_3$, $Co_3O_4$, $MnO_2$, $Cr_2O_3$ all with a purity of at least 99% and glass component A in proportions shown in Table 2 was prepared. Deionized water was then added in the mixture which was ground in a ball mill for 24 hours. Next, the mixture was filtered, dried and calcined at a temperature of 700° C. for 2 hours. Deionized water was added in the calcined powder and the mixture was ground in a ball mill for 24 hours. The solution was filtered and dried, and the obtained powder was stored for use for tape casting.

Glass composition A shown in Table 1 was added to the above obtained powder to decrease the sintering temperature of the process. Binder, dispersant, plasticizer, releasing agent and a solvent were also added into the above prepared calcined powder to form a slurry. Then the technique of tape casting was utilized to produce a chip type multilayer zinc oxide varistor. It was noted that the position of the doctor blade and the viscosity of the slurry should be controlled during the process for producing green sheets with thicknesses in the range of 20 to 200 μm. Subsequently, about 20 layers of green sheets printed with internal electrodes were laminated to form a laminated assembly comprising internal electrodes extending in parallel with each other and connecting to the external lead-out electrodes. To decrease the leakage current of the product, five raw sheets without internal electrodes printed thereon were respectively superimposed above and under the laminated assembly to make a total of 30 sheets. Subsequently, the laminated assembly was compressed under a pressure of 2,000 psi at a temperature of 70° C. The laminated assembly was cut according to the position of internal electrodes therein to result in the internal electrodes mutually exposing on the opposite edges of the laminated assembly. The cut green sheet was sintered at a temperature of 1,100° C. for 2 hours. Then the sintered green sheet was coated with silver paste for external electrode and then was heated at 600° C. to reduce the silver paste to produce a multilayer zinc oxide varistor. A cross-sectional view of the produced varistor according to the present invention is shown in FIG. 1.

Figure 2:
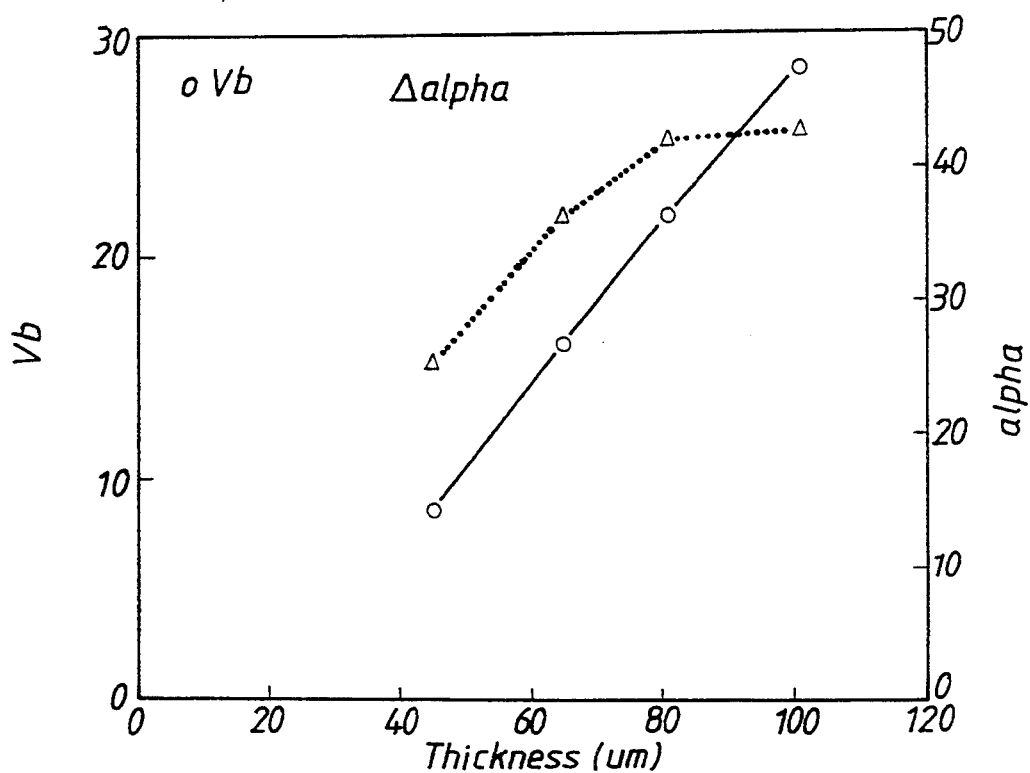
FIG. 2 is a graph showing the relationship of breakdown voltage $V_{1mA}$ and nonlinear coefficient $\alpha$ with the thickness of the multilayer zinc oxide varistor of Example 1.

The characteristics of the above produced multilayer zinc oxide varistors, such as the nonlinear coefficient α, breakdown voltage $V_{1mA}$, etc., were tested to demonstrate the practical uses. Particularly, the surge withstanding capability test was proceeded to prove the absorbance capability for surges of the sample. According to the standards for low voltage chip varistors and taking into account the electrode area effect, the test conditions were described as below: an electric current of 630 A, i.e., a surge of 500 A/cm$^2$, was used to test the sample twice at an interval of 5 minutes. Then the current-voltage (I-V) property of the multilayer varistor was tested again to determine the breakdown voltage of the tested sample and to calculate the change rate of the breakdown voltage. In addition, a voltage of 0.8 $V_{1mA}$ was loaded on the varistor at a temperature of 130° C. for different periods of time to record the leakage current, shown at the unit of microampere per square centimeter, and to decide the leakage current with respect to the time stability. The results are shown in Table 2 and FIGS. 2-4.

TABLE 2

| | The compositions and test results of Example 1 | | | | | | | | | | |
|---|---|---|---|---|---|---|---|---|---|---|---|
| | Composition (mole %) | | | | | | Glass A | thickness of basic | $V_{1mA}$ | | $\Delta V/V_{1mA}$ |
| No. | ZnO | $Bi_2O_3$ | $Sb_2O_3$ | $Co_3O_4$ | $MnO_2$ | $Cr_2O_3$ | (wt. %) | layer (μm) | (V) | α | (%) |
| 1. | 97 | 0.5 | 1 | 0.5 | 0.5 | 0.5 | 2 | 45 | 8.67 | 25.19 | 2.49 |
| 2. | 97 | 0.5 | 1 | 0.5 | 0.5 | 0.5 | 2 | 65 | 16.10 | 36.18 | 2.98 |
| 3. | 97 | 0.5 | 1 | 0.5 | 0.5 | 0.5 | 2 | 80 | 21.74 | 41.83 | 2.52 |
| 4. | 97 | 0.5 | 1 | 0.5 | 0.5 | 0.5 | 2 | 100 | 28.32 | 42.46 | 0.72 |

The thickness of the basic layer, i.e., varistor layer, in Table 2 is the thickness of a green sheet shaped with a doctor blade. As can be seen from FIG. 2, the breakdown voltage $V_{1mA}$ increases as the thickness of a single varistor layer increases. Hence, various ratings of multilayer varistors can be produced by controlling the thicknesses of the varistor layers. Although the nonlinear coefficient α decreases as the breakdown voltage $V_{1mA}$ decreases, the value of the nonlinear coefficient α is larger than that of other disk-type varistors with low breakdown voltage.

Figure 3:
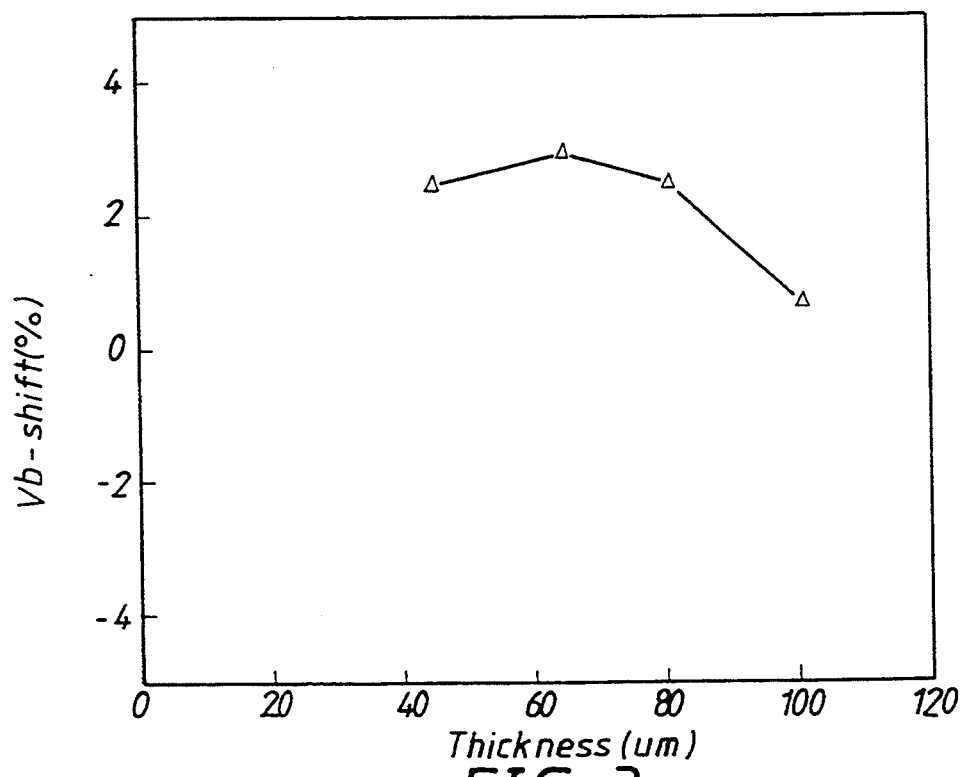
FIG. 3 is a graph showing the relationship of the change rate of breakdown voltage $\Delta V/V_{1mA}$ with the thickness of the multilayer zinc oxide varistor of Example 1.

FIG. 3 shows the change rate of breakdown voltage after a varistor is loaded with surges and it is clear that the change rate of breakdown voltage is related to the thickness of the green sheet. The thinner the green sheet, the larger the change rate of breakdown voltage will be. However, the varistors produced according to the present invention all meet the commercial requirements.

Figure 4:
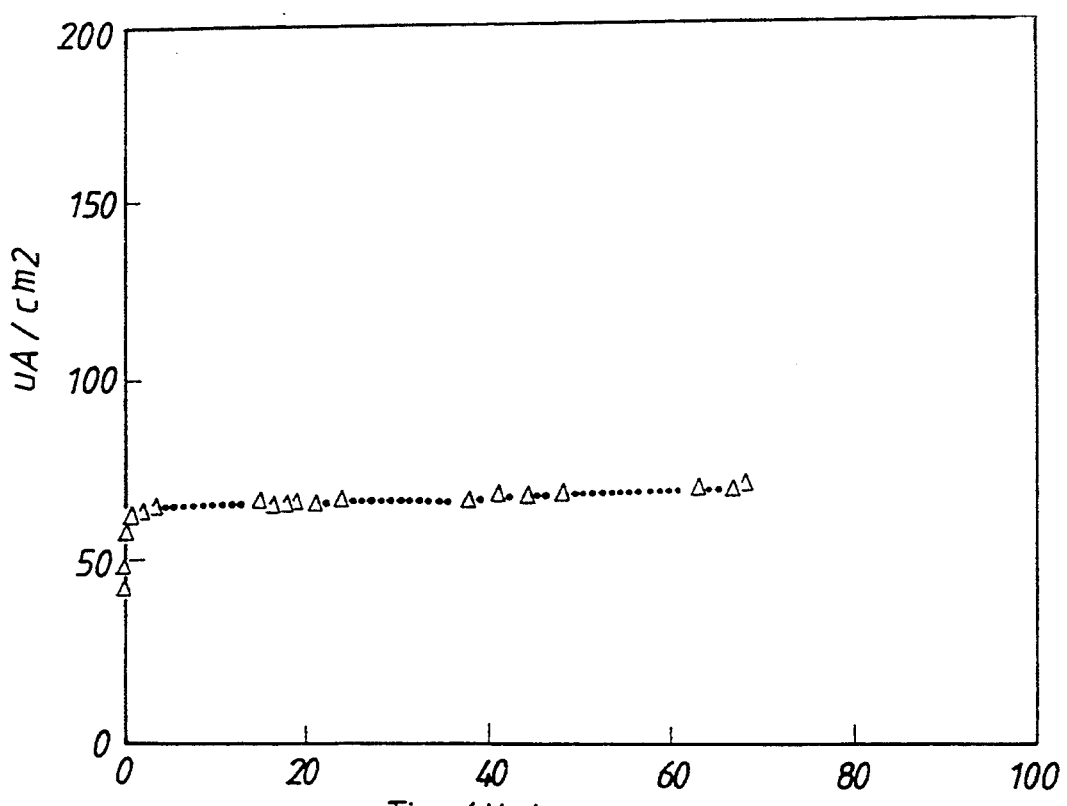
FIG. 4 is a graph showing the leakage current stability with respect to time of the multilayer zinc oxide varistor of Example 1.

Referring to FIG. 4, except the initial leakage current which is slightly increasing, the long time leakage current of this example is relatively low and stable compared to that of the known commercial products.

EXAMPLE 2

In this example, the starting raw materials were the same as those in Example 1. The procedures of Example 1 were repeated. Also, 2 wt. % glass composition was added to form a slurry. And the glass component in this example comprising compositions B, C or D as shown in Table 1, or Ni was used to enhance the surge withstanding capability thereof. The finished products were tested to determine the electrical properties. The results are tabulated in Table 3 and FIG. 5.

TABLE 3

The composition and test results of Example 2

| No. | ZnO | $Bi_2O_3$ | $Sb_2O_3$ | $Co_3O_4$ | $MnO_2$ | $Cr_2O_3$ | $Ni_2O_3$ | Glass | thickness of basic layer (μm) | $V_{1mA}$ (V) | α | $\Delta V/V_{1mA}$ (%) |
|---|---|---|---|---|---|---|---|---|---|---|---|---|
| 1. | 97 | 0.5 | 1 | 0.5 | 0.5 | 0.5 | — | A | 100 | 28.32 | 42.46 | 0.72 |
| 2. | 97 | 0.5 | 1 | 0.5 | 0.5 | 0.5 | — | B | 100 | 25.44 | 32.31 | X |
| 3. | 97 | 0.5 | 1 | 0.5 | 0.5 | 0.5 | 0.5 | B | 90 | 24.58 | 35.38 | 2.26 |
| 4. | 97 | 0.5 | 1 | 0.5 | 0.5 | 0.5 | — | C | 100 | 28.42 | 31.83 | X |
| 5. | 97 | 0.5 | 1 | 0.5 | 0.5 | 0.5 | 0.5 | C | 90 | 24.77 | 36.92 | 4.0 |
| 6. | 97 | 0.5 | 1 | 0.5 | 0.5 | 0.5 | — | D | 52 | 18.39 | 27.32 | 2.08 |

"X" represents the varistor being sputtered out and having no varistor characteristic.

As can be seen from Table 3, different glass compositions do not influence significantly the breakdown voltages and the nonlinear coefficient α, but have great influence on the surge withstanding capabilities. For example, the surge withstanding capabilities of the produced varistors containing glass composition B or C are very poor and in two instances, the varistor characteristics are even lost because they were broke down. The varistors containing $Ni_2O_3$ have pretty good surge withstanding capabilities and the change rate of the breakdown voltages all less than 10%. That is, the added $Ni_2O_3$ is useful to enhance the surge withstanding capabilities of the varistors with glass system comprising no Pb component. Thus, Pb—B—Si, Zn—B—Si and Pb—B—Zn—Si glass systems can all be used to produce multilayer zinc oxide varistors.

Figure 5:
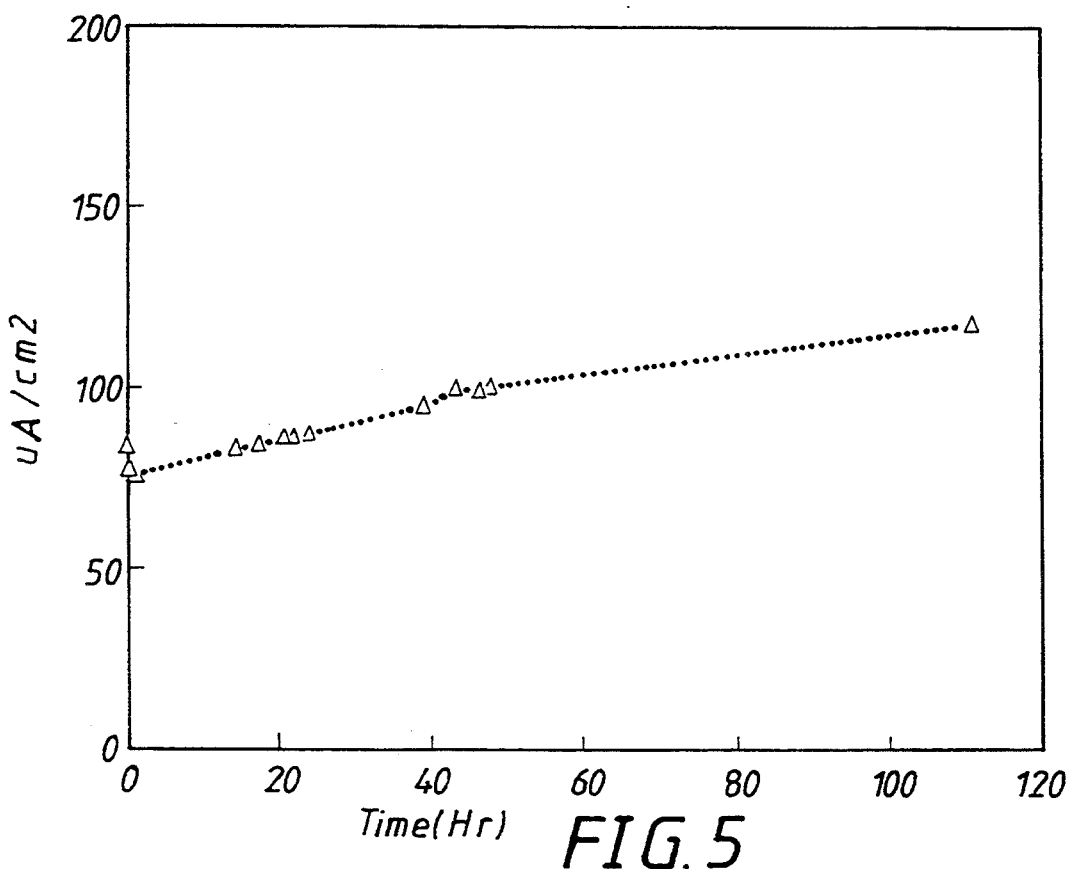
FIG. 5 is a graph showing the leakage current stability with respect to time of the multilayer zinc oxide varistor of Example 2, No. 3.

FIG. 5 shows the leakage current stability with respect to time of the produced varistor of No. 3. A voltage of 0.8 breakdown voltage was applied to the varistor at 130° C. and then the leakage current was measured for degradation. It is clearly shown that the leakage current is stable with respect to time and the initial leakage current is quite low. This shows varistors with this formulation have practical utility.

COMPARATIVE EXAMPLE 1

This comparative example was used to compare with examples 1 and 2. The major difference was that in this comparative example, $Bi_2O_3$ was not added to produce the multilayer varistor. In this comparative example, the starting raw materials were ZnO, $Sb_2O_3$, $Co_3O_4$, $MnO_2$, $Cr_2O_3$, and $Ni_2O_3$, and their basic proportions were 97 ZnO+$Sb_2O_3$+0.5($Co_3O_4$+$MnO_2$+$Cr_2O_3$). Furthermore, $Ni_2O_3$, or $Bi_2O_3$ alone or both were added to the basic proportions of the raw materials for comparison. By repeating the procedures Example 1, the varistor compositions with or without $Bi_2O_3$ were separately ground in a ball mill, calcined, crushed and otherwise processed following the previously mentioned procedures to produce multilayer zinc oxide varistors. Glass composition A, B or D or $Ni_2O_3$ was added to form the slurries for examples 4, 5 and 6 respectively. The glass compositions, all about 2 wt. %, were added for the purpose of lowering the sintering temperatures. The finished products were tested to determine the electrical properties. The results are tabulated in Table 4.

TABLE 4

The composition and test results of Comparative Example 1

| No. | The second Component (mole %) $Bi_2O_3$ | $Ni_2O_3$ | glass | thickness of basic layer (μm) | $V_{1mA}$ (V) | α | $\Delta V/V_{1mA}$ (%) |
|---|---|---|---|---|---|---|---|
| 1. | 0.5 | — | A | 100 | 28.32 | 42.46 | 0.72 |
| 2. | — | — | A | 60 | 17.84 | 26.90 | 3.36 |
| 3. | 0.5 | 0.5 | B | 90 | 24.58 | 35.38 | 2.26 |
| 4. | — | 0.5 | B | 65 | 18.21 | 24.31 | X |
| 5. | 0.5 | — | D | 52 | 18.39 | 27.32 | 2.08 |
| 6. | — | — | D | 70 | 18.24 | 32.82 | 2.08 |

"X" represents the samples with no varistor characteristics after being applied with surges.

It is noted in Table 4 that the composition systems with or without Bi, and particularly those with glass compositions A and B, for the finished samples made differed greatly in the surge withstanding capabilities. The samples containing no Bi component had comparatively poor surge withstanding capabilities. For instance, the varistor sample No. 4 containing no Bi component was tested by the surge voltage and was found that the sample lost the varistor characteristic because of being broken-down. However, sample No. 3 containing glass composition B and Bi component had pretty good surge withstanding capabilities and the change rate of breakdown voltage thereof was small, meeting commercial specifications. For varistor compositions containing glass composition B and 0.5 mole % of $Ni_2O_3$, the surge withstanding capability of the varistor containing component Bi is 10 times that of the varistor containing no component Bi. From these results, it is clearly shown that the composition containing Zn—B—Si glass system but no component Bi is not suitable for the production of a multilayer zinc oxide varistor. Furthermore, the compositions containing component Bi and Pb—B—Si glass system have better surge withstanding capabilities than those containing Pb—B—Si glass system and no component Bi.

To sum up, varistor compositions containing component Bi have better surge withstanding capabilities than that of Utsumi et al. as can be evidenced by the examples. In Utsumi et al.'s technique, the varistor characteristics are essentially originated at the inter-surface between zinc oxide and the added Pb—Zn—B—Si glass, and the glass added to the chip zinc oxide varistor system will reduce its surge withstanding capability. However, the characteristics of the present invention are that the composition system containing component Bi is utilized to produce multilayer zinc oxide varistors with arbitrary regulated voltage. In addition, the varistor characteristic of the invention of good surge withstanding capability results from the inter-surface between the zinc oxide particle and the layer containing component Bi. Although glass is also added in the varistor composition of the present invention, the amount is relatively low and only equals to 1/10–1/5 of that in the prior art. The purpose of the addition of glass in the present invention is to reduce the sintering temperature rather than to produce the varistor characteristic.

The multilayer zinc oxide varistor of the present invention is produced by improved technique to possess variable breakdown voltages. In prior art, Pb—B—Zn—Si glass was used as a major forming agent for the varistor characteristics of multilayer zinc oxide varistors. Although glass is also added in the present invention, the purpose for this addition is to decrease the sintering temperature and to improve the anti-degradation property. The forming agent for the varistor characteristics of the multilayer varistor is $Bi_2O_3$ and the produced multilayer zinc oxide varistors have better surge withstanding capabilities than that produced by the prior art. Furthermore, by adding a small amount of glass, the multilayer varistors produced according to this invention have low leakage currents and good anti-degradation characteristics.

Of course it is understood that the above is merely a preferred embodiment of the invention and that various changes and alterations can be made without departing from the spirit and broader aspects thereof as set forth in the appended claims.

We claim:

1. A multilayer zinc oxide varistor with variable breakdown voltages comprising:
   a ceramic base body having a voltage-dependent nonlinear resistance which comprises at least 90 mole % ZnO, at most 10 mole % metallic oxides as additives, 0.05 to 5 mole % $Bi_2O_3$ and 0 to 10 wt. % glass on the basis of the total weight of all the oxides, provided that the total amount of zinc oxide and metallic oxides is less than 99.95 mole %;
   a first external electrode on a first surface portion of said ceramic base body;
   a second external electrode on a second surface portion of said ceramic base body opposite to said first surface;
   a plurality of first internal electrodes extending parallel to one another within the ceramic base body with one edge of said plurality of first internal electrodes being flush and in contact with said first external electrode;
   a plurality of second internal electrodes extending parallel to one another within the ceramic base body and alternately between said plurality of first internal electrodes, with one edge of said plurality of second internal electrodes being flush and in contact with said second external electrode; and
   except for one edge of said plurality of first and second internal electrodes which is flush and connected to the respective external electrode, the other edges of each internal electrode are enclosed within the ceramic base body, whereby the breakdown voltages of the multilayer zinc oxide varistor are controlled by varying the thicknesses of the ceramic base body between two parallel internal electrodes.

2. The multilayer zinc oxide varistor as set forth in claim 1, wherein the thickness of the ceramic body between two said internal electrodes is about 20 to 200 µm.

3. The multilayer zinc oxide varistor as set forth in claim 1, wherein the metallic oxide additives comprise at least three metallic oxides in which the metal is selected from the group consisting of Co, Mn, Bi, Sb, Cr, Ni, Ti, Sn, La, Nd, Pr, Ba, Mg, Ce and B.

4. The multilayer zinc oxide varistor as set forth in claim 1, wherein the internal electrode is made of metal selected from the group consisting of Au, Ag, Pd, Pt, Rh and an alloy of any two of the above recited metals.

5. The multilayer zinc oxide varistor as set forth in claim 3, wherein the amount of Ni contained in said ceramic base body is in the range of 0 to 3 mole %.

* * * * *

UNITED STATES PATENT AND TRADEMARK OFFICE
CERTIFICATE OF CORRECTION

PATENT NO. : 5,369,390

DATED : November 29, 1994

INVENTOR(S) : Lin et al.

It is certified that error appears in the above-identified patent and that said Letters Patent is hereby corrected as shown below:

On the Title page, in [75], line 2, "Chio-" should read --Chih--.

In column 1, line 33, "characteristics" should read --characteristic--.

In column 3, line 20, delete "," after the word "varistor".

In column 4, line 6, "of glass by weight of glass" should read --by weight of glass--.

In column 4, line 44, delete "," after the word "sheet".

In column 5, line 15, "of" should read --for--.

In column 5, line 18, "of back" should read --of each--.

In column 5, line 33, "Sb2O3" should read --$Sb_2O_3$--.

UNITED STATES PATENT AND TRADEMARK OFFICE
CERTIFICATE OF CORRECTION

PATENT NO. : 5,369,390

DATED : November 29, 1994

INVENTOR(S) : Lin et al.

It is certified that error appears in the above-identified patent and that said Letters Patent is hereby corrected as shown below:

In column 7, line 60, "MnO2" should read --$MnO_2$--.

In column 7, line 63, insert --of-- after the word "procedures".

In column 8, line 38, delete "made" after the word "samples".

In column 9, line 17, insert --the-- after the word "In".

In column 10, line 29, insert --base-- after the word "ceramic".

Signed and Sealed this

Twenty-ninth Day of July, 1997

Attest:

BRUCE LEHMAN

*Attesting Officer*  *Commissioner of Patents and Trademarks*